United States Patent
Wei

(10) Patent No.: US 12,063,192 B2
(45) Date of Patent: Aug. 13, 2024

(54) INFORMATION DISPLAY METHOD, INFORMATION SENDING METHOD, AND ELECTRONIC DEVICE

(71) Applicant: VIVO MOBILE COMMUNICATION CO., LTD., Guangdong (CN)

(72) Inventor: Wei Wei, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 3 days.

(21) Appl. No.: 17/746,808

(22) Filed: May 17, 2022

(65) Prior Publication Data

US 2022/0278950 A1 Sep. 1, 2022

Related U.S. Application Data

(63) Continuation of application No. PCT/CN2020/128945, filed on Nov. 16, 2020.

(30) Foreign Application Priority Data

Nov. 19, 2019 (CN) .......................... 201911132306.1

(51) Int. Cl.
   *H04L 51/216* (2022.01)
   *H04L 51/214* (2022.01)
   *H04L 51/224* (2022.01)

(52) U.S. Cl.
   CPC .......... *H04L 51/216* (2022.05); *H04L 51/214* (2022.05); *H04L 51/224* (2022.05)

(58) Field of Classification Search
   CPC ..... H04L 51/04; H04L 51/214; H04L 51/216; H04L 51/046; H04L 51/52; H04L 51/224;
   (Continued)

(56) References Cited

U.S. PATENT DOCUMENTS 8,264,341 B2 * 9/2012 Jung ................ H04N 21/43615
                                                    348/14.05
8,803,690 B2 * 8/2014 Junqua ................... G16H 20/70
                                                    340/691.3
(Continued)

FOREIGN PATENT DOCUMENTS

CN       103269303 A      8/2013
CN       104052655 A      9/2014
(Continued)

OTHER PUBLICATIONS

European Patent Office, Partial Supplemental European Search Report for European Patent Application No. 20890361.7 dated Dec. 1, 2022.
(Continued)

*Primary Examiner* — Ninos Donabed
(74) *Attorney, Agent, or Firm* — Brooks Kushman P.C.

(57) ABSTRACT

An information display method, an information sending method, and an electronic device are provided. The information display method includes: receiving reminder information sent by a target group, where the reminder information includes first information, a name of the target group, and reply information for the first information; displaying the reminder information and displaying a first button and a second button; and in a case that an input on the first button is received, displaying a group chat session screen corresponding to the name of the target group, where currently displayed content of the group chat session screen includes the reply information; or in a case that an input on the second button is received, displaying a first session screen corresponding to a user sending the first information, and displaying the first information and the reply information on the first session screen.

4 Claims, 11 Drawing Sheets

(58) Field of Classification Search
CPC . H04L 65/403; H04L 12/1813; H04L 51/043; H04L 51/58
See application file for complete search history.

(56) References Cited

U.S. PATENT DOCUMENTS

| | | | | |
|---|---|---|---|---|
| 8,886,243 | B1* | 11/2014 | Pabla | H04L 51/214 455/518 |
| 9,300,785 | B2* | 3/2016 | Lee | H04L 51/214 |
| 9,335,904 | B2* | 5/2016 | Junqua | G16H 40/40 |
| 9,551,611 | B2* | 1/2017 | Oliver | G01J 1/0219 |
| 9,674,132 | B1* | 6/2017 | Zhang | G06F 16/338 |
| 11,388,119 | B2* | 7/2022 | Shin | H04L 51/214 |
| 2009/0253446 | A1 | 10/2009 | Chambers et al. | |
| 2010/0005402 | A1* | 1/2010 | George | H04L 51/04 715/758 |
| 2013/0069969 | A1 | 3/2013 | Chang et al. | |
| 2013/0176127 | A1* | 7/2013 | Junqua | G06F 16/211 340/573.1 |
| 2013/0179472 | A1* | 7/2013 | Junqua | G06F 16/211 707/796 |
| 2013/0268839 | A1* | 10/2013 | Lefebvre | G06F 40/10 715/254 |
| 2013/0297692 | A1* | 11/2013 | Raji | H04L 65/403 709/204 |
| 2013/0311470 | A1* | 11/2013 | Lotfi | G06F 16/35 707/737 |
| 2013/0332543 | A1* | 12/2013 | Shin | H04L 51/046 709/206 |
| 2014/0019290 | A1* | 1/2014 | Beaver | G06Q 10/0833 705/26.81 |
| 2014/0020008 | A1* | 1/2014 | Numano | H04N 21/6125 725/106 |
| 2014/0068468 | A1 | 3/2014 | Yoon | |
| 2014/0164945 | A1* | 6/2014 | Junqua | G16H 20/70 715/747 |
| 2015/0120389 | A1* | 4/2015 | Zhang | G06Q 10/10 705/7.32 |
| 2015/0120653 | A1* | 4/2015 | Luo | G06F 16/35 707/610 |
| 2015/0163182 | A1 | 6/2015 | Chandrasekaran | |
| 2016/0044073 | A1* | 2/2016 | Rosenberg | H04L 67/535 715/753 |
| 2016/0048274 | A1* | 2/2016 | Rosenberg | G06F 3/04847 715/753 |
| 2016/0057182 | A1* | 2/2016 | Rosenberg | G06F 3/0482 715/753 |
| 2016/0154570 | A1* | 6/2016 | Rosenberg | H04L 67/12 715/753 |
| 2016/0170594 | A1* | 6/2016 | Rosenberg | H04L 69/24 715/753 |
| 2016/0170616 | A1* | 6/2016 | Rosenberg | G06F 3/0485 715/753 |
| 2016/0212255 | A1* | 7/2016 | Lee | H04M 1/7243 |
| 2016/0314527 | A1* | 10/2016 | Rosenberg | G06F 3/04847 |
| 2017/0048171 | A1* | 2/2017 | Shin | H04W 4/20 |
| 2017/0124291 | A1* | 5/2017 | Barken | G16Z 99/00 |
| 2017/0300198 | A1* | 10/2017 | Rosenberg | G06F 3/04842 |
| 2017/0352008 | A1* | 12/2017 | Gao | G06Q 10/1097 |
| 2018/0018629 | A1* | 1/2018 | Elston | G06Q 10/0875 |
| 2018/0046726 | A1 | 2/2018 | Zhang | |
| 2018/0076968 | A1* | 3/2018 | Rosenberg | G06N 20/00 |
| 2018/0097753 | A1* | 4/2018 | Gill | H04L 51/02 |
| 2018/0159812 | A1 | 6/2018 | Sarafa et al. | |
| 2018/0203580 | A1* | 7/2018 | Rosenberg | G06Q 10/10 |
| 2018/0241703 | A1 | 8/2018 | Feuz et al. | |
| 2018/0248998 | A1 | 8/2018 | Kim | |
| 2018/0255007 | A1 | 9/2018 | Ji et al. | |
| 2019/0034059 | A1 | 1/2019 | Brummer et al. | |
| 2022/0303235 | A1* | 9/2022 | Shin | H04W 4/20 |

FOREIGN PATENT DOCUMENTS

| | | |
|---|---|---|
| CN | 104901871 A | 9/2015 |
| CN | 105553834 A | 5/2016 |
| CN | 106020595 A | 10/2016 |
| CN | 107222382 A | 9/2017 |
| CN | 107707461 A | 2/2018 |
| CN | 108449194 A | 8/2018 |
| CN | 109120495 A | 1/2019 |
| CN | 109981304 A | 7/2019 |
| CN | 111130989 A | 5/2020 |
| DE | 202017106516 U1 | 3/2018 |
| JP | 2014096096 A | 5/2014 |
| JP | 6576582 B1 | 9/2019 |

OTHER PUBLICATIONS

First Office Action for Chinese Application No. 201911132306.1, dated Mar. 25, 2021, 8 Pages.
International Search Report and Written Opinion for Application No. PCT/CN2020/128945, dated Feb. 19, 2021, 9 Pages.
First Office Action for Indian Application No. 202227029586, dated Oct. 10, 2022, 7 Pages.
First Office Action for Japanese Application No. 2022-526279, dated Jun. 28, 2023, 2 Pages.

* cited by examiner

INFORMATION DISPLAY METHOD, INFORMATION SENDING METHOD, AND ELECTRONIC DEVICE

CROSS-REFERENCE TO RELATED APPLICATIONS

This application is a continuation application of International Application No. PCT/CN2020/128945 filed on Nov. 16, 2020, which claims priority to Chinese Patent Application No. 201911132306.1, filed on Nov. 19, 2019, which are incorporated herein by reference in their entireties.

TECHNICAL FIELD

The present invention relates to the field of communications technologies, and in particular, to an information display method, an information sending method, and an electronic device.

BACKGROUND

Currently, one display screen may be displayed on an electronic device, and information sent by a plurality of users may be displayed on the display screen, so as to exchange information with the plurality of users. In actual application, if different user information is updated too fast, a plurality of pieces of other information are included between one piece of information and reply information for the information, resulting in a relatively low correspondence between the information and the reply information for the information on the display screen. Therefore, it can be learned that currently, a display effect of reply information for information is relatively poor.

SUMMARY

Embodiments of the present invention provide an information display method, an information sending method, and an electronic device, so as to resolve a current problem of a relatively poor display effect of reply information for information.

In order to resolve the foregoing technical problem, the present invention is implemented as follows:

According to a first aspect, an embodiment of the present invention provides an information display method, applied to an electronic device, and the method includes:
  receiving reminder information sent by a target group, where the reminder information includes first information, a name of the target group, and reply information for the first information;
  displaying the reminder information and displaying a first button and a second button; and
  in a case that an input on the first button is received, displaying a group chat session screen corresponding to the name of the target group, where currently displayed content of the group chat session screen includes the reply information; or
  in a case that an input on the second button is received, displaying a first session screen corresponding to a user sending the first information, and displaying the first information and the reply information on the first session screen.

According to a second aspect, an embodiment of the present invention further provides an information sending method, including:
  receiving reply information for first information;
  generating reminder information based on the first information and the reply information, where the reminder information includes the first information and the reply information; and
  sending the reminder information to a target group.

According to a third aspect, an embodiment of the present invention further provides an electronic device, including:
  a first receiving module, configured to receive reminder information sent by a target group, where the reminder information includes first information, a name of the target group, and reply information for the first information;
  a first display module, configured to display the reminder information and display a first button and a second button;
  a second display module, configured to: in a case that an input on the first button is received, display a group chat session screen corresponding to the name of the target group, where currently displayed content of the group chat session screen includes the reply information; and
  a third display module, configured to: in a case that an input on the second button is received, display a first session screen corresponding to a user sending the first information, and display the first information and the reply information on the first session screen.

According to a fourth aspect, an embodiment of the present invention further provides an electronic device, including:
  a second receiving module, configured to receive reply information for first information;
  a generating module, configured to generate reminder information based on the first information and the reply information, where the reminder information includes the first information and the reply information; and
  a second sending module, configured to send the reminder information to a target group.

According to a fifth aspect, an embodiment of the present invention further provides an electronic device, including a memory, a processor, and a computer program stored in the memory and capable of running on the processor. When the computer program is executed by the processor, the steps of the information display method or the information sending method are implemented.

According to a sixth aspect, an embodiment of the present invention further provides a computer-readable storage medium, where a computer program is stored in the computer-readable storage medium, and when the computer program is executed by a processor, the steps of the information display method or the information sending method are implemented.

In the embodiments of the present invention, the reminder information sent by the target group is received, where the reminder information includes the first information, the name of the target group, and the reply information for the first information. The reminder information is displayed, and the first button and the second button are displayed. In the case that the input on the first button is received, the group chat session screen corresponding to the name of the target group is displayed, where the currently displayed content of the group chat session screen includes the reply information; or in the case that the input on the second button is received, the first session screen corresponding to the user sending the first information is displayed, and the first information and the reply information is displayed on the first session screen. In this way, during displaying of the reminder information, because the reminder information includes both the first information and the reply information for the first information, it is clear that the reply information is the reply information for the first information, and a correspondence between the reply information and the first information is enhanced, thereby improving a display effect of the reply information. In addition, displaying of the group chat session screen or the first session screen specific to the sending user can be also selected, further enhancing a display effect of the reply information and improving flexibility of a display manner.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
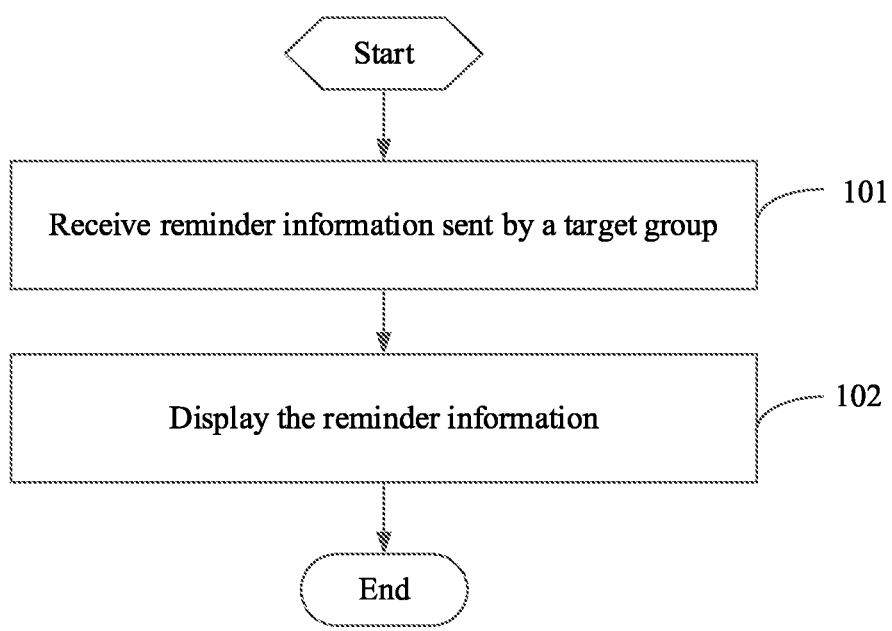
FIG. 1 is a flowchart of an information display method according to an embodiment of the present invention.

Referring to FIG. 1, FIG. 1 is a flowchart of an information display method according to an embodiment of the present invention. The method is applied to an electronic device. As shown in FIG. 1, the method includes the following steps.

Step 101: Receive reminder information sent by a target group, where the reminder information includes first information and reply information that is for the first information and from a first electronic device.

A type of the first information is not limited herein. For example, the first information may be text information, image information, video information, voice information, or the like. It should be noted that types of the reply information and the first information may be the same or different.

For example, when the first information is voice information, the reply information may be text information; or when the first information is text information, the reply information may be voice information.

Step 102: Display the reminder information.

The first information may be partial or all content of target information. When the first information is partial content of the target information, that is, the target information may include a plurality of segments of first information, and content of the plurality of segments of first information may be different, the reminder information may include the plurality of segments of first information and reply information for each segment of first information.

It should be noted that when the reminder information includes the plurality of segments of first information, during displaying of the reminder information, the target information may be displayed in a first position, reply information for a first segment of first information in the target information may be displayed in a second position, reply information for a second segment of first information in the target information may be displayed in a third position, and so on. Both the second position and the third position are located on one side of the first position, and the second position is located between the first position and the third position.

The reminder information may further include reminding mode information, and the reminding mode information may include at least one of vibration, ring, or other mode information. In this way, when the first information and the reply information are being displayed, the electronic device may vibrate or ring simultaneously. Certainly, the reminding mode information may also include at least one of being magnified for display, being displayed in a preset color, and being displayed in a preset brightness value. Therefore, the first information and the reply information can be magnified for display, displayed in a preset color, or displayed with a preset brightness value, achieving the purpose of better prompting the user. It should be noted that specific values of the preset color and the preset brightness value are not limited herein.

In addition, the reminder information may further include: display manner information corresponding to the reply information. For example, when the reply information is text information, display manner information corresponding to the reply information may be digit information (that is, the reply information in the reminder information may be displayed in a form of a digit). When an operation input on the digit by the user is received, content (that is, text information) of the corresponding reply information is displayed. Preferably, the content of the corresponding reply information is displayed only after the operation input on the digit by the user is received and security verification is successful. This can reduce leakage of the content of the reply information caused by directly displaying the text information of the reply information, and improve display security of the reply information.

In addition, it should be noted that during displaying of the reminder information, all content included in the reminder information may be displayed, or only the first information and the reply information for the first information that are included in the reminder information may be displayed. A specific display manner of the reminder information is not limited herein.

In addition, during displaying of the reminder information, the display format may be: "Reply to +first information+reply information for the first information", for example, "Reply to How is the weather today? The weather is sunny today, suitable for travel." In the foregoing reminder information, content of the first information is: How is the weather today? Content of the reply information is: The weather is sunny today, suitable for travel.

In addition, during displaying of the reminder information, a button for viewing source information may also be displayed, and when an operation on the button for the source information is received, the first information may be directly displayed, for example, being magnified for display, being displayed in a preset color, or being displayed in a preset brightness value.

This embodiment of the present invention may be applied to an electronic device. The electronic device may be a mobile phone, a tablet computer), a laptop computer, a personal digital assistant (PDA), a mobile Internet device (MID), a wearable device, or the like.

In this embodiment of the present invention, the reminder information sent by the first electronic device is received, where the reminder information includes the first information and the reply information that is for the first information and from the first electronic device; and the reminder information is displayed. In this way, during displaying of the reminder information, because the reminder information includes both the first information and the reply information for the first information, it is clear that the reply information is the reply information for the first information, and a correspondence between the reply information and the first information is enhanced, thereby improving a display effect of the reply information.

Figure 2:
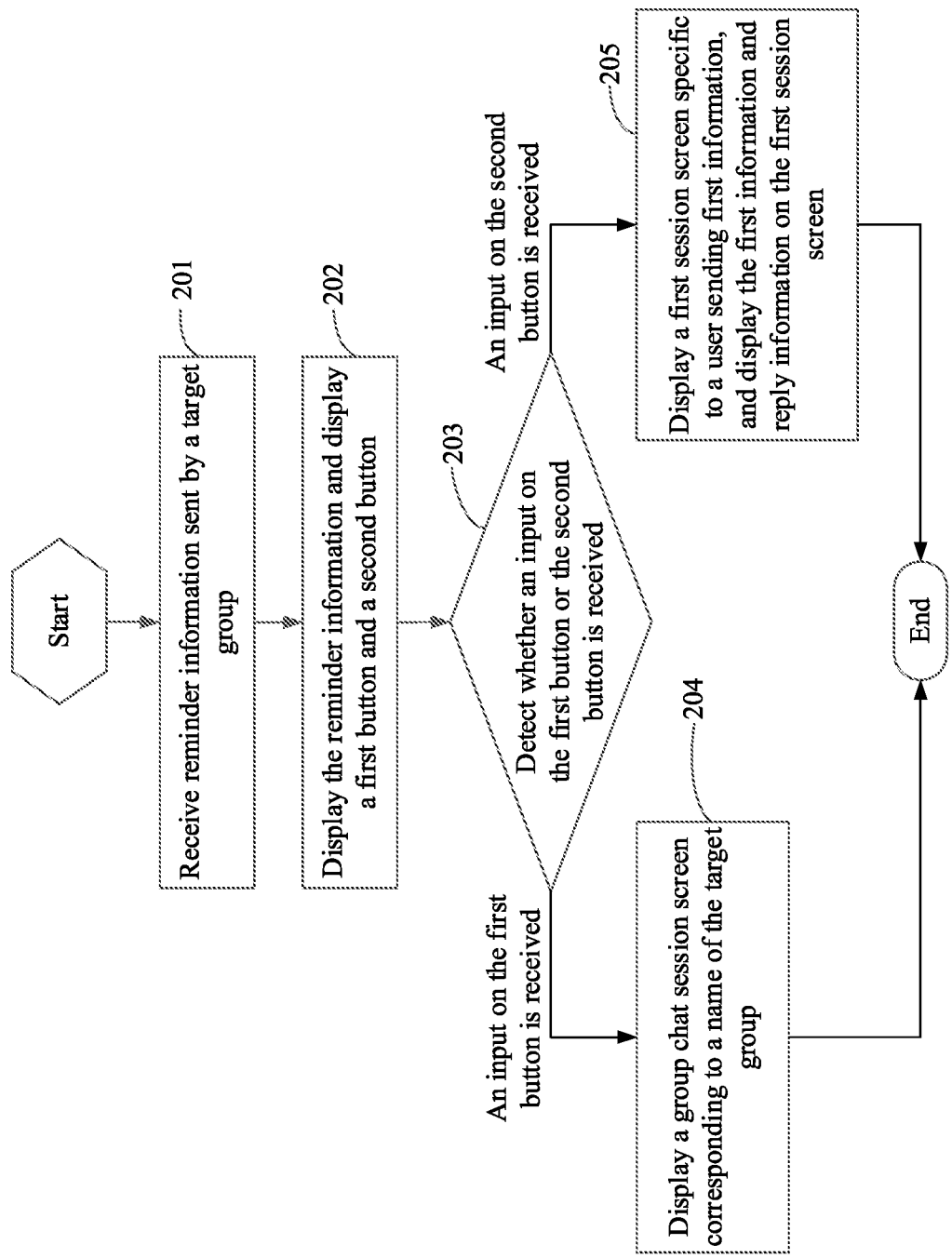
FIG. 2 is a flowchart of another information display method according to an embodiment of the present invention.

Referring to FIG. 2, FIG. 2 is a flowchart of another information display method according to an embodiment of the present invention. A main difference between this embodiment and the foregoing embodiment lies in that a first button and a second button can also be displayed when reminder information is displayed, and in a case that an input on the first button or an input on the second button is received, a corresponding chat screen may be displayed. As shown in FIG. 2, the method includes the following steps.

Step 201: Receive reminder information sent by a target group, where the reminder information includes first information and reply information for the first information, and the reminder information also includes a name of the target group.

It should be noted that a group chat in this embodiment may refer to that of the target group, and correspondingly, a name of the group chat may be the name of the target group.

A type of the first information is not limited herein. For example, the first information may be text information, image information, video information, voice information, or the like. It should be noted that types of the reply information and the first information may be the same or different.

For example, when the first information is voice information, the reply information may be text information; or when the first information is text information, the reply information may be voice information.

Optionally, the first information is all or partial information content of target information.

The first information may be partial or all content of the target information. When the first information is partial content of the target information, that is, the target information may include a plurality of segments of first information, and content of the plurality of segments of first information may be different, the reminder information may include the plurality of segments of first information and reply information for each segment of first information.

It should be noted that when the reminder information includes the plurality of segments of first information, during displaying of the reminder information, the target information may be displayed in a first position, reply information for a first segment of first information in the target information may be displayed in a second position, reply information for a second segment of first information in the target information may be displayed in a third position, and so on. Both the second position and the third position are located on one side of the first position, and the second position is located between the first position and the third position.

In this embodiment of the present invention, the first information may be all or partial content of the target information. When the first information is partial content of the target information, the reminder information may include the plurality of segments of first information and the reply information for each segment of first information, which is more flexible in replying to the target information including the plurality of segments of the first information.

Step 202: Display the reminder information and display the first button and the second button.

A specific display manner of the first button and the second button is not limited herein. For example, the first button and the second button may be displayed on the electronic device in a form of virtual buttons, and the first button and the second button may be displayed in a square, diamond, or circle manner.

Figure 3:
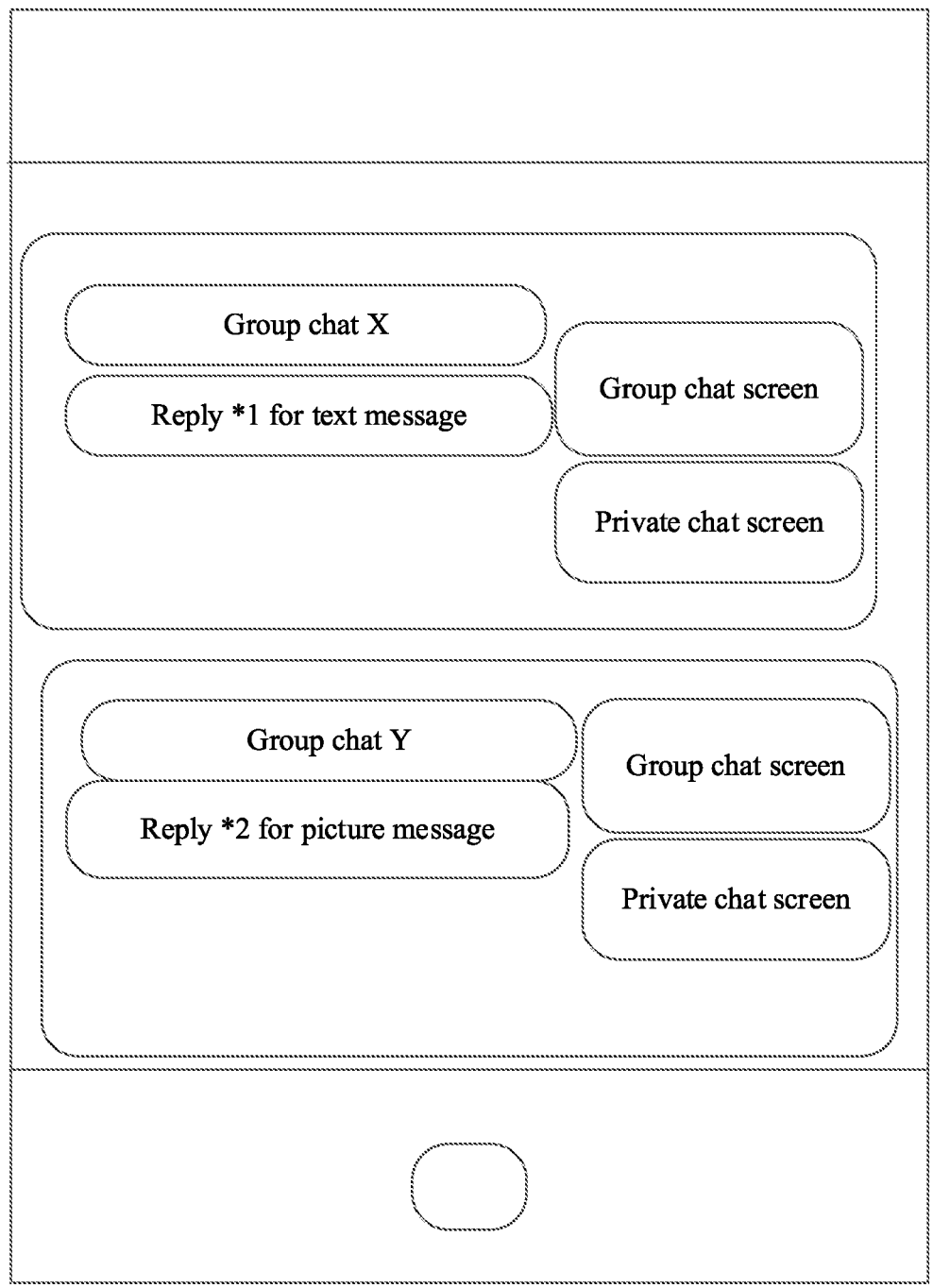
FIG. 3 is a first schematic diagram of a display screen of an electronic device according to an embodiment of the present invention.
Figure 4:
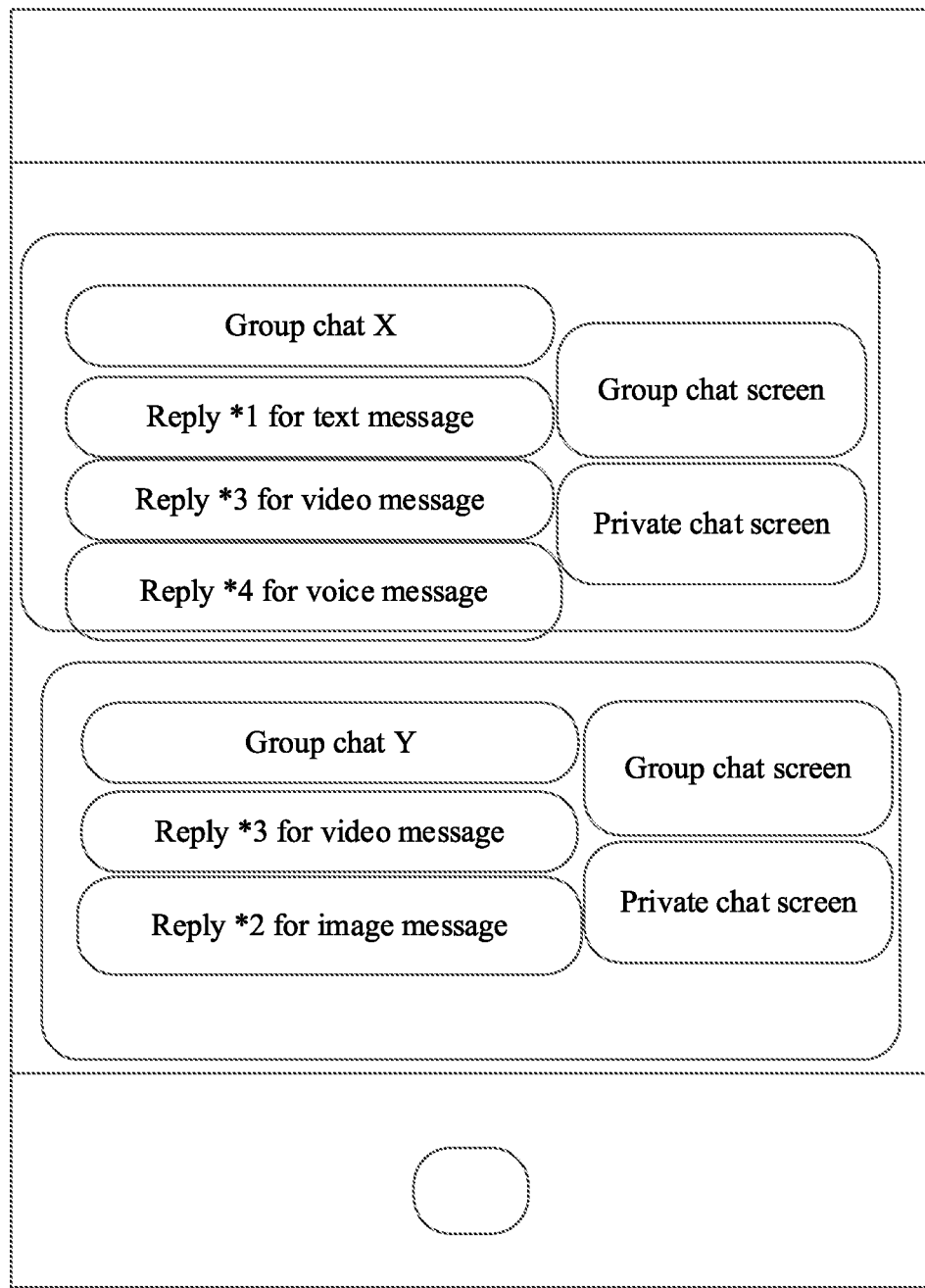
FIG. 4 is a second schematic diagram of a display screen of an electronic device according to an embodiment of the present invention.

Referring to FIG. 3 and FIG. 4, when the electronic device is in a standby state, display screens shown in FIG. 3 and FIG. 4 may be displayed on the electronic device. The first button may be a button for displaying a group chat screen, and the second button may be a button for displaying a private chat screen. In addition, during displaying of the reminder information, only the name of the group chat and prompt information for obtaining the reply information may be displayed, For example, as shown in FIG. 3 and FIG. 4, names "Group chat X" and "Group chat Y" of group chats may be displayed, and the prompt information for obtaining the reply information is "Reply *1 for text information" and "Reply *2 for picture information". After the user inputs corresponding information such as "*1" or "*2", the first information and the reply information may be displayed.

Optionally, after the displaying the reminder information, the method further includes:

storing a correspondence between the first information and the reply information; and sending the correspondence to a server.

It should be noted that this embodiment of the present invention may also be applied to the embodiment shown in FIG. 1.

A key-value query pair may be established between the first information and the reply information, and the key-value query pair is sent to the server. The key-value query pair is stored in the server. In addition, after a period of time, when needing to query content of the first information and that of the reply information, the user may input partial or all content of the first information, so as to obtain the first information and the reply information through query. Certainly, partial or all content of the reply information may alternatively be input for query. It can also be construed as: after the key-value query pair is established, content of either the key or the value, may be entered to query for content of the other.

In addition, when the content of the first information or that of the reply information needs to be queried for, selection may be first made based on a type of the to-be-queried-for content, and then a keyword is entered to query for the content. For example, when the to-be-queried-for content is text information, the type of the to-be-queried-for content being text information content (a selection screen with image information content, text information content, video information content, or voice information content may be displayed, and the text information content may be selected according to an input operation of the user) is selected and then a keyword is entered for query, so as to obtain the first information or the reply information. It should be noted that the keyword may also be partial or all content of either the first information or the reply information. In this way, type selection before query can implement accurate query of the to-be-queried-for content, reducing workload of the query and improving a query speed.

In addition, after the correspondence between the first information and the reply information is deleted from the electronic device, in a case that query information is received, the query information may be sent to the server, and a query result sent by the server and returned for the query information may be received, so as to implement query for the first information or the reply information.

In this embodiment of the present invention, the correspondence between the first information and the reply information is stored, facilitating subsequent query for the first information or the reply information. In addition, the correspondence is sent to the server, so that the correspondence can be backed up. After the correspondence stored in the electronic device is deleted, the first information or the reply information can also be obtained from the server through query, improving query experience of the user.

Step 203: Detect whether an input on the first button or the second button is received, and perform step 204 in a case that the input on the first button is received, or perform step 205 in a case that the input on the second button is received.

The types of the input on the first button and the input on the second button may be the same or different. For example, the input on the first button may be a touch input, and the input on the second button may be a slide input.

Step 204: Display a group chat session screen corresponding to the name of the target group, where currently displayed content of the group chat session screen includes the reply information.

The group chat session screen may include information sent by group chat members. Certainly, the currently displayed content of the group chat session screen also includes reply information. For example, the reply information may be displayed in the middle of the group chat session screen.

Further, the reply information may alternatively be magnified for display in the group chat session screen, the reply information may alternatively be displayed in a preset color, or the reply information may alternatively be displayed in a preset brightness value. Certainly, the preset brightness value may be greater than a brightness value for displaying other content.

In addition, it should be noted that historical information or current information that is included in the group chat session screen corresponding to the name of the group chat includes the first information and the reply information.

Figure 5:
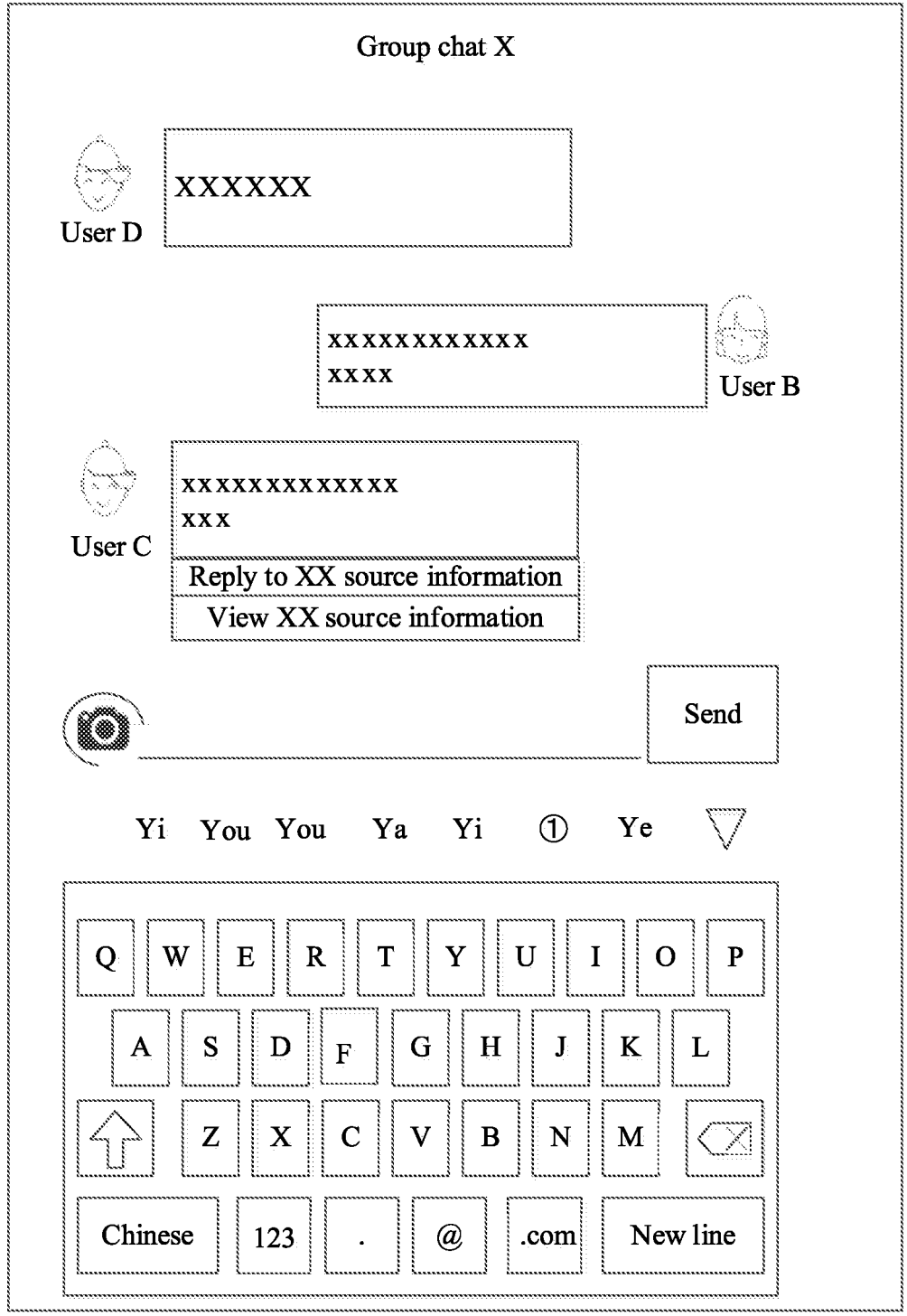
FIG. 5 is a third schematic diagram of a display screen of an electronic device according to an embodiment of the present invention.

The first information and the reply information are displayed in the group chat session screen. When a plurality of segments of first information and a plurality of segments of reply information are included, referring to FIG. 5, a display manner may be: displaying a first segment of reply information (in FIG. 5, XXXX sent by a user C), and displaying first information (Reply to XX source information in FIG. 5) corresponding to this segment of reply information in a position on one side of this piece of reply information. Certainly, a second segment of reply information and first information corresponding to the second segment of reply information may also be displayed in a position on one side of this segment of reply information. In addition, as shown in FIG. 5, an option for viewing the first information (XX source information) may also be displayed, and when the option for viewing the XX source information is received, the first information may be directly displayed.

Step 205: Display a first session screen specific to a user sending the first information, and display the first information and the reply information on the first session screen.

Figure 6:
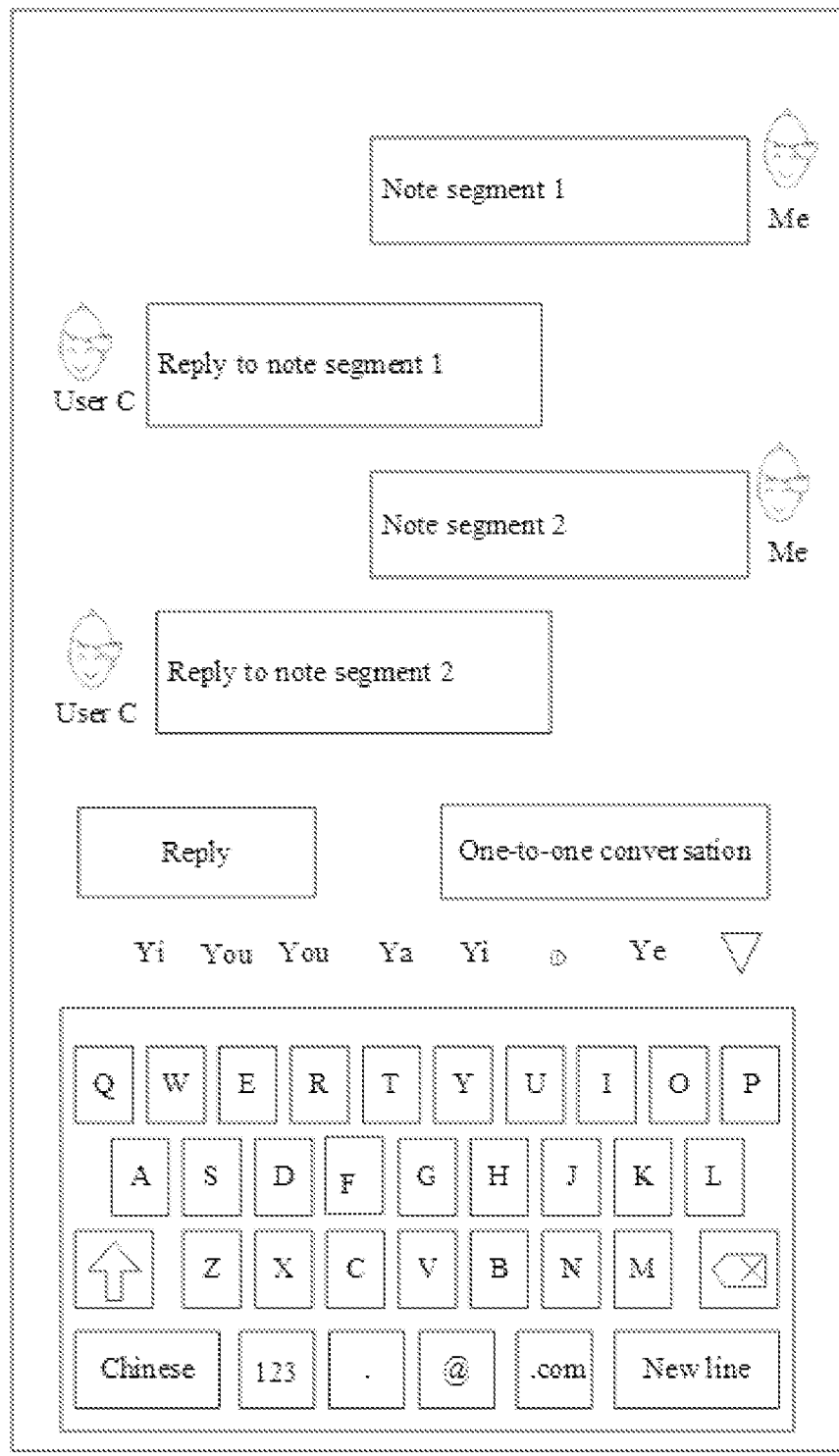
FIG. 6 is a fourth schematic diagram of a display screen of an electronic device according to an embodiment of the present invention.

It should be noted that a sending user and a user receiving the reminder information sent by the first electronic device may both belong to users in a same group chat. Referring to FIG. 6, further, a reply button and a one-to-one session button may also be displayed on the first session screen. After an input on the reply button is received, the user may enter second information (for example, a note segment 1 and a note segment 2 that are entered by the user "Me" in FIG. 6) on the first session screen; and when the sending user (for example, user C in FIG. 6) enters second reply information ("Reply to note segment 1" and "Reply to note segment 2" in FIG. 6) for the second information, the second information and the second reply information may also be synchronized to the group chat. After an input on the one-to-one session button is received, the user enters the second information on the first session screen, and when the sending user enters the second reply information for the second information, the second information and the second reply information do not need to be synchronized to the group chat.

In this embodiment of the present invention, in steps 201 to 205, the group chat session screen may be displayed in the case that an input on the first button is received, and the first session screen specific to the sending user may be displayed in the case that an input on the second button is received. In this way, displaying of the group chat session screen or the first session screen may be selected as required, offering more flexible selection of a chat screen, and information can be continuously entered in the group chat session screen or the first session screen, further improving flexibility of information input.

Figure 7:
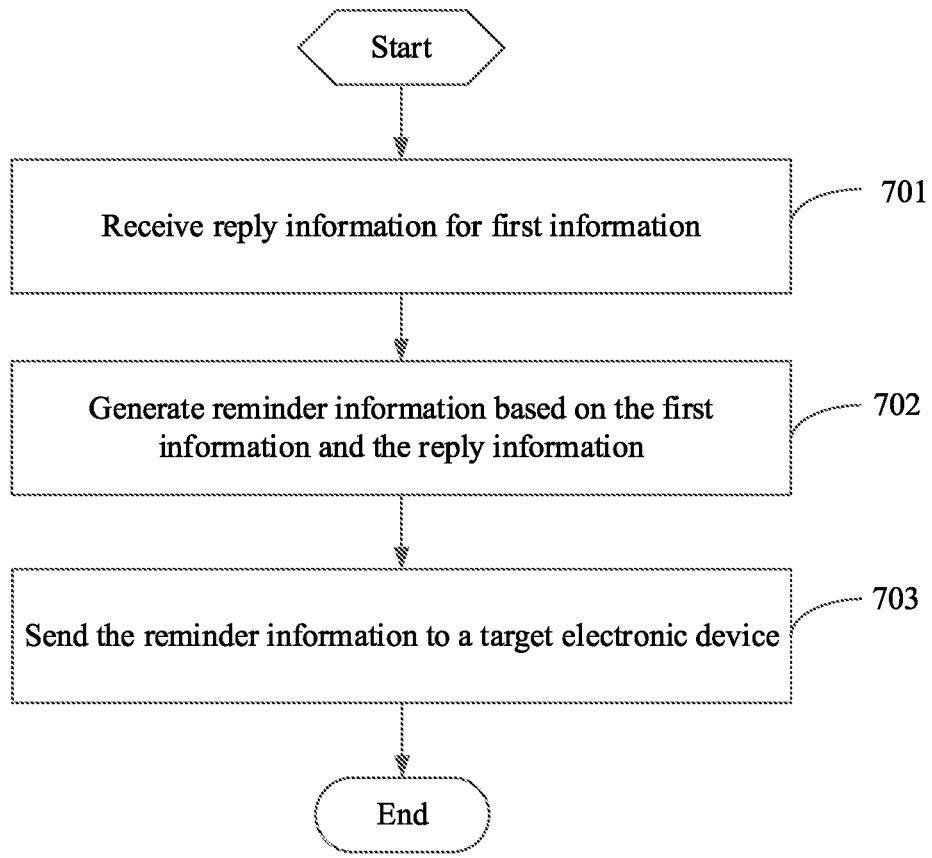
FIG. 7 is a flowchart of an information sending method according to an embodiment of the present invention.

Referring to FIG. 7, FIG. 7 is a flowchart of an information sending method according to an embodiment of the present invention. A main difference between this embodiment and the foregoing embodiment lies in that this embodiment of the present invention is applied to a first electronic device and reminder information can be generated. As shown in FIG. 7, the method includes the following steps.

Step 701: Receive reply information for first information.

A specific type of the reply information is not specifically limited herein. For example, the reply information may be text information or voice information.

A type of the first information is not limited herein. For example, the first information may be text information, image information, video information, voice information, or the like. It should be noted that types of the reply information and the first information may be the same or different.

Optionally, the first information is partial information content of target information, and before the receiving reply information for first information, the method further includes:

displaying the target information, and displaying a reply button for the target information and a reply button for the first information; and in a case that an input on the reply button for the first information has been received, determining the first information and receiving the reply information for the first information.

It should be noted that the target information may be displayed first, and in a case that a preset input on the target information is received, a reply button for the target information and a reply button for the first information may be displayed; or the target information, the reply button for the target information, and the reply button for the first information may be displayed simultaneously. The preset input may be a touch-control operation that is on the target information and exceeds a first preset time value, where a specific value of the first preset time value is not limited herein.

The first information may be determined from the target information in the following manner: If the target information is text information, partial content of the target information may be selected as the first information by using a selection box; if the target information is image information, a specific part of image in the image information may be selected as the first information by using a selection box; if the target information is audio information, part of audio information in the target information may be clipped as the first information; or if the target information is video information, a segment of video information in the target information may be clipped as the first information.

Optionally, after the displaying the target information, and displaying a reply button for the target information and a reply button for the first information, the method further includes:

in a case that an input on the reply button for the target information has been received, receiving target reply information for the target information;

generating target reminder information based on the target information and the target reply information, where the target reminder information includes the target information and the target reply information; and sending the target reminder information to a target group.

The target information may be a specific piece of information sent by a specific user.

Figure 8:
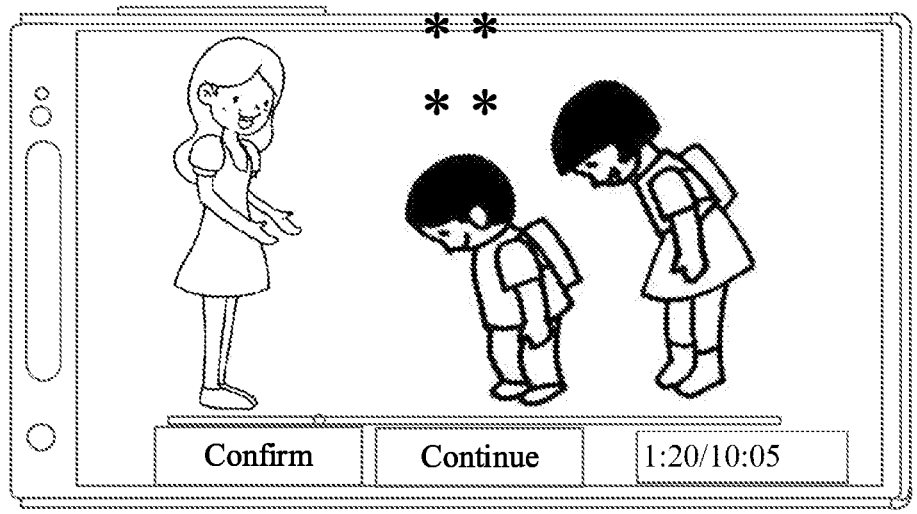
FIG. 8 is a fifth schematic diagram of a display screen of an electronic device according to an embodiment of the present invention.

In a case that an input on the reply button for the first information has been received, the reply information for the first information is then received. For example, when the target information is image information, the first information may be face image information selected from the image information by using a box; when the target information is text information, the first information may be a first segment of text information in the text information; or when the target information is voice information, the first information may be a segment of voice information in the voice information. Certainly, the first information may alternatively be text information, and the text information may be converted from the segment of voice information. In addition, the target information may alternatively be video information, and the first information may be a segment of video information clipped from the video information. It should be noted that when the target information is voice information or video information, a clipping start button and a clipping end button may also be displayed. When the clipping start button is tapped, clipping of the voice information or video information can be started; and when the clipping end button is touched, clipping terminates. A segment of voice information or a segment of video information clipped in the foregoing manner is the first information. In addition, referring to FIG. 8, buttons marked Confirm and Continue, and a current display status may also be displayed.

In this embodiment of the present invention, in the case that an input on the reply button for the first information has been received, the reply information for the first information is then received. In this way, whether to reply to the first information in the target information or to reply to the target information may be first selected, improving flexibility of the reply.

Step 702: Generate reminder information based on the first information and the reply information, where the reminder information includes the first information and the reply information.

For descriptions of the reminder information, the first information, and the reply information, reference may be made to the corresponding descriptions in the embodiments shown in FIG. 1 and FIG. 2. Details are not repeated herein.

In addition, when the target information includes a plurality of segments of first information, one piece of reminder information may be generated based on each segment of first information, and a target receiving account may be bound to the reminder information, so that corresponding reminder information can be sent an electronic device on which the target receiving account is logged in.

It should be noted that, when a target receiving account of one segment of first information and that of another segment of first information are a same receiving account, one piece of reminder information may be generated, and the reminder information may include the one segment of first information and corresponding reply information, and the another segment of first information and corresponding reply information.

Figure 9:
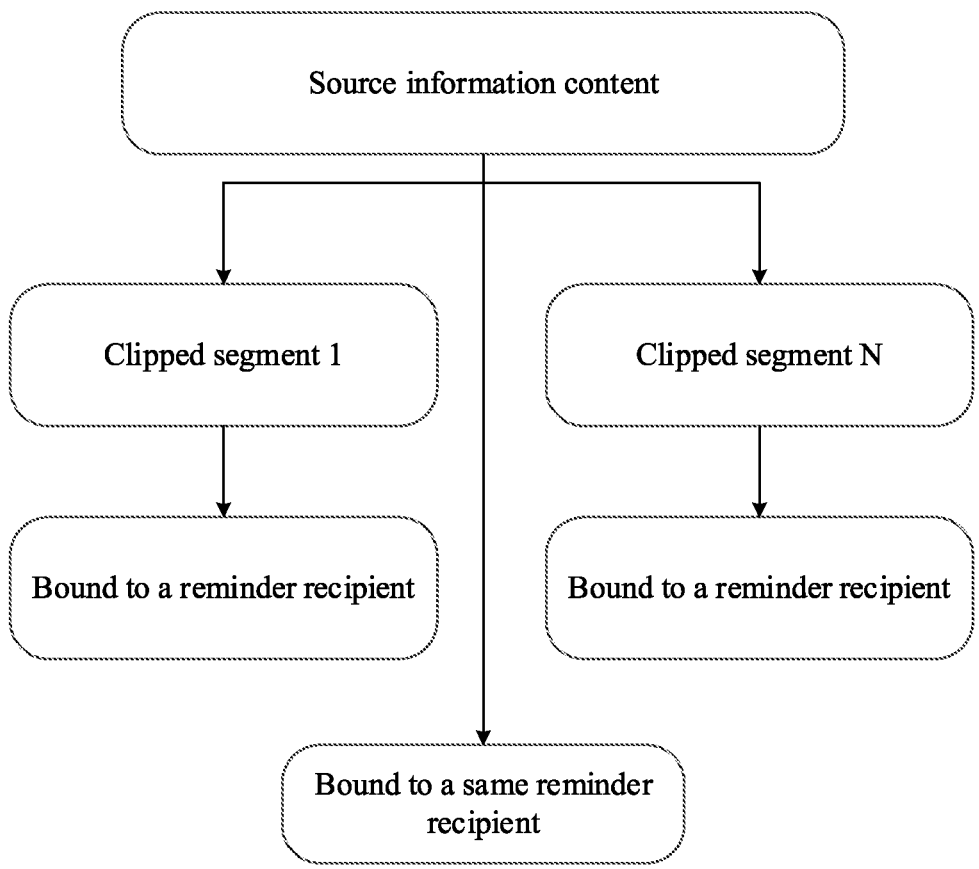
FIG. 9 is a sixth schematic diagram of a display screen of an electronic device according to an embodiment of the present invention.

For example, referring to FIG. 9, the target information is source information content, and a reminder recipient (that is, the target receiving account) may be bound to the entire source information content. Certainly, one reminder recipient may alternatively be bound (that is, one target receiving account is bound) with each segment of first information (such as a clipped segment 1 and a clipped segment N) in the target information.

Step 703: Send the reminder information to a target group.

Optionally, the reminder information further includes a target account, and the target account is an account corresponding to a user in the target group.

In this embodiment of the present invention, the reminder information further includes the target account, and the target account is an account corresponding to the user in the target group. This can improve accuracy of sending the reminder information, and reduce occurrence of sending the reminder information to other users by mistake.

In this embodiment of the present invention, in steps 701 to 703, the reminder information is generated and the reminder information is sent to a target electronic device, so as to prompt the target electronic device in a timely manner to receive the reply information for the first information.

Figure 10:
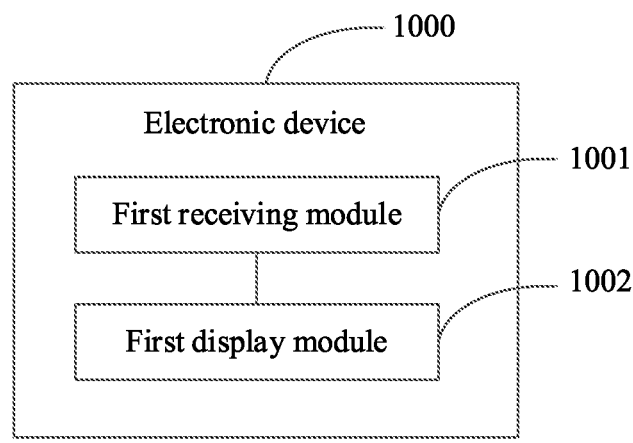
FIG. 10 is a schematic structural diagram of an electronic device according to an embodiment of the present invention.

Referring to FIG. 10, FIG. 10 is a structural diagram of an electronic device according to an embodiment of the present invention, and the electronic device is capable of implementing details of the information display method in the foregoing embodiment, with the same effects achieved. As shown in FIG. 10, the electronic device 1000 includes:

a first receiving module 1001, configured to receive reminder information sent by a target group, where the reminder information includes first information, a name of the target group, and reply information for the first information;

a first display module 1002, configured to display the reminder information and display a first button and a second button;

a second display module 1003, configured to: in a case that an input on the first button is received, display a group chat session screen corresponding to the name of the target group, where currently displayed content of the group chat session screen includes the reply information; and a third display module 1004, configured to: in a case that an input on the second button is received, display a first session screen corresponding to a user sending the first information, and display the first information and the reply information on the first session screen.

Figure 11:
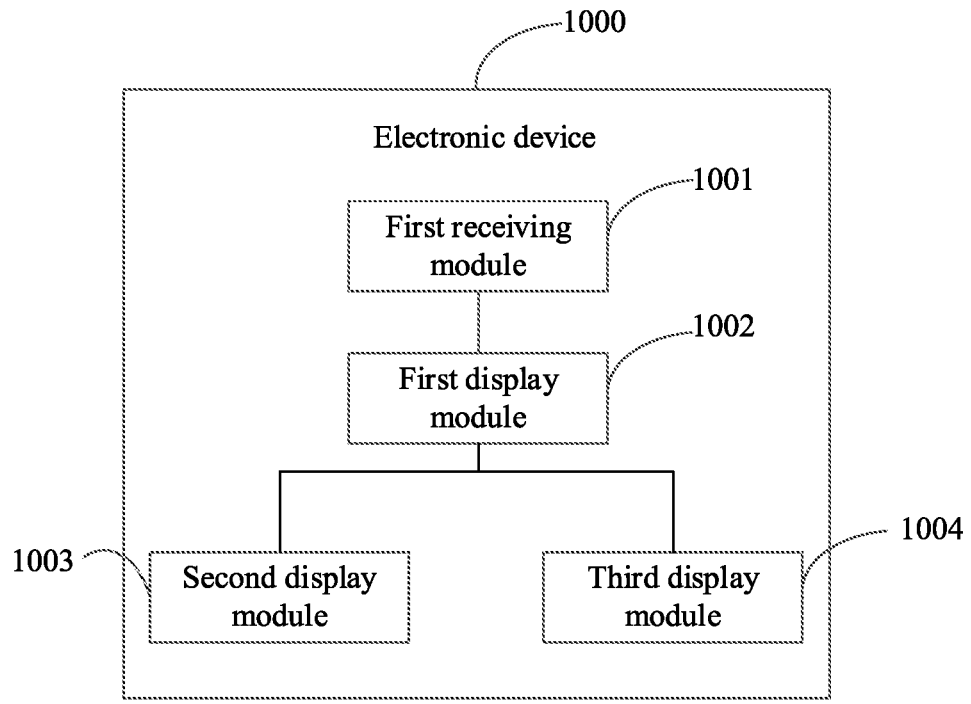
FIG. 11 is a schematic structural diagram of another electronic device according to an embodiment of the present invention.

It should be noted that, referring to FIG. 11, the electronic device 1000 may include both the second display module 1003 and the third display module 1004, or include only one of the second display module 1003 and the third display module 1004.

Optionally, the first information is all or partial information content of the target information.

Figure 12:
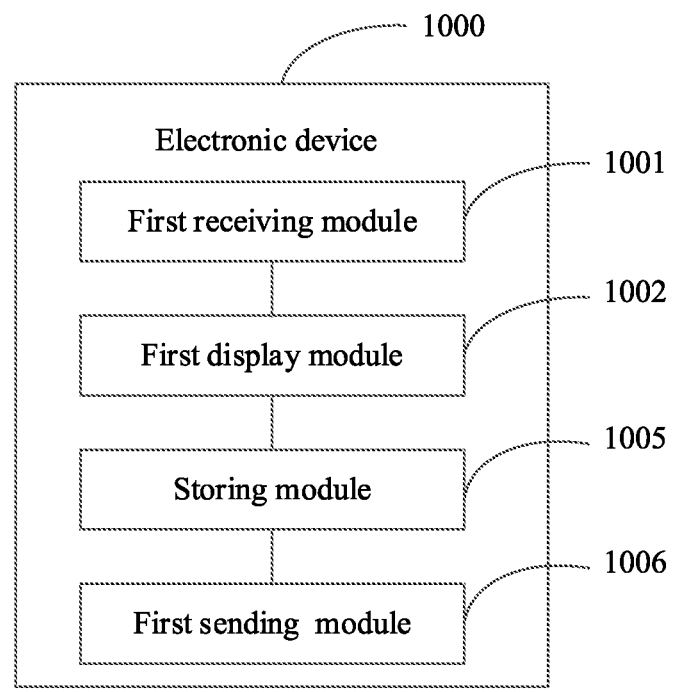
FIG. 12 is a schematic structural diagram of another electronic device according to an embodiment of the present invention.

Optionally, referring to FIG. 12, the electronic device 1000 further includes:

a storing module 1005, configured to store a correspondence between the first information and the reply information; and a first sending module 1006, configured to send the correspondence to a server.

The electronic device 1000 is capable of implementing the processes implemented by the electronic device in the method embodiments of FIG. 1 and FIG. 2. To avoid repetition, details are not described herein again.

Figure 13:
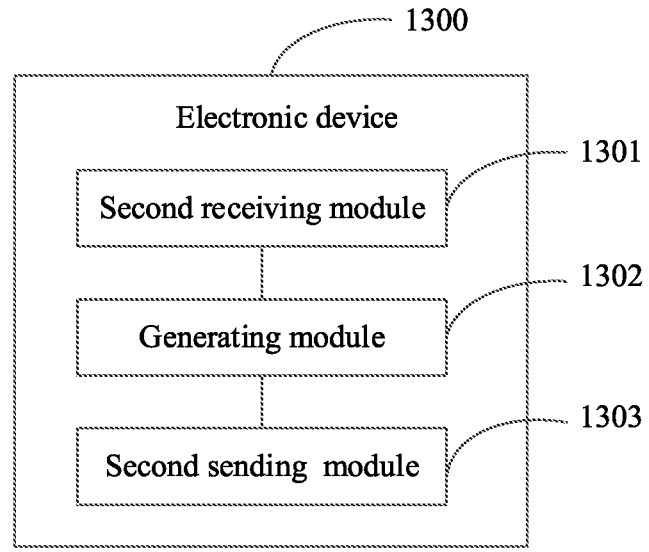
FIG. 13 is a schematic structural diagram of another electronic device according to an embodiment of the present invention.

Optionally, referring to FIG. 13, an embodiment of the present invention further provides an electronic device 1300, including:

a second receiving module 1301, configured to receive reply information for first information;

a generating module 1302, configured to generate reminder information based on the first information and the reply information, where the reminder information includes the first information and the reply information; and a second sending module 1303, configured to send the reminder information to a target group.

Figure 14:
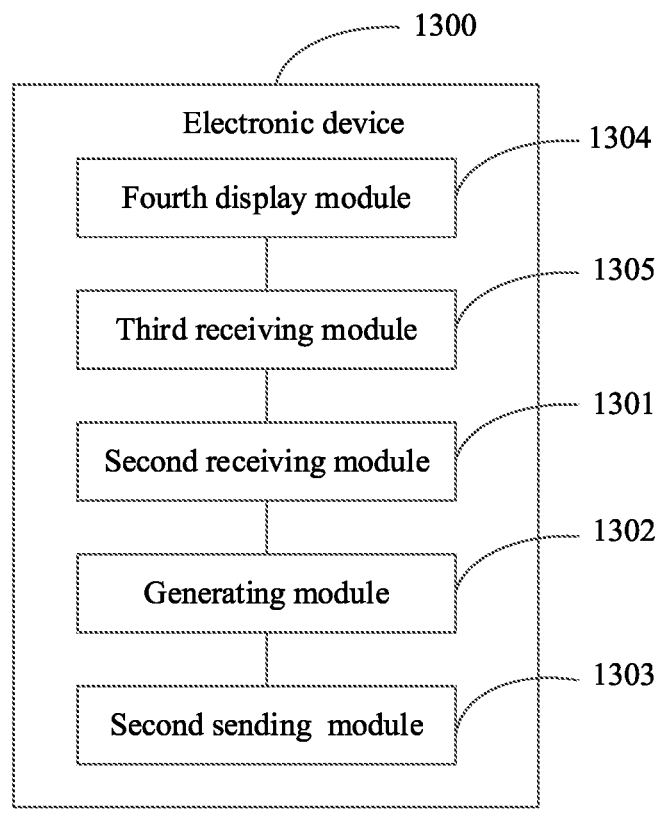
FIG. 14 is a schematic structural diagram of another electronic device according to an embodiment of the present invention.

Optionally, referring to FIG. 14, the first information is partial information content of target information; and the electronic device 1300 further includes:

a fourth display module 1304, configured to display the target information, and display a reply button for the target information and a reply button for the first information; and a third receiving module 1305, configured to: in a case that an input on the reply button for the first information has been received, determine the first information and receive the reply information for the first information.

Optionally, the reminder information further includes a target account, and the target account is an account corresponding to a user in the target group.

The electronic device provided in this embodiment of the present invention is capable of implementing processes that are implemented by the electronic device in the foregoing method embodiment of FIG. 7. To avoid repetition, details are not described herein again.

Figure 15:
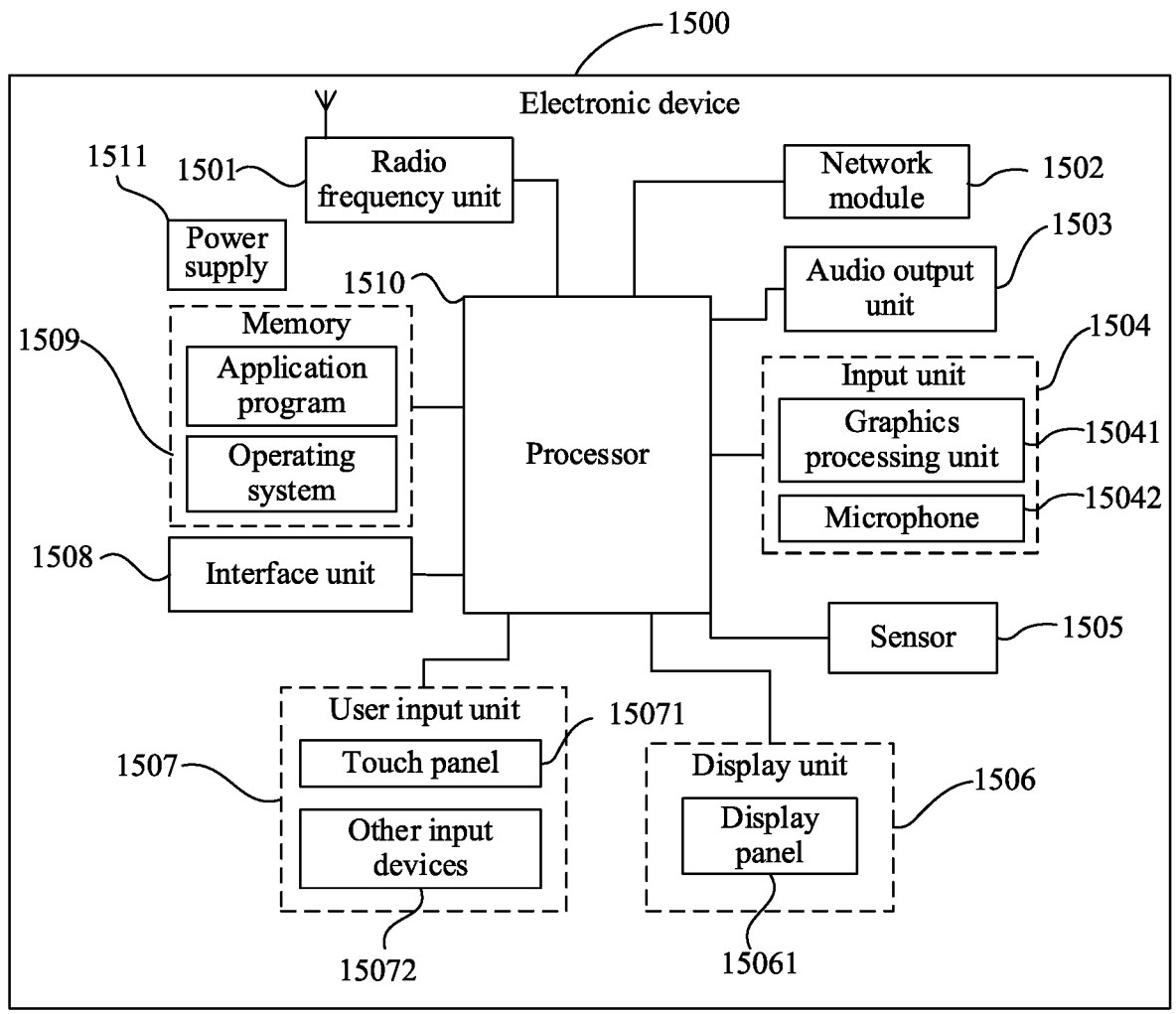
FIG. 15 is a schematic structural diagram of another electronic device according to an embodiment of the present invention.

FIG. 15 is a schematic diagram of a hardware structure of an electronic device for implementing the embodiments of the present invention.

The electronic device 1500 includes but is not limited to components such as a radio frequency unit 1501, a network module 1502, an audio output unit 1503, an input unit 1504, a sensor 1505, a display unit 1506, a user input unit 1507, an interface unit 1508, a memory 1509, a processor 1510, and a power supply 1511. A person skilled in the art can understand that the structure of the electronic device shown in FIG. 15 does not constitute any limitation on the electronic device. The electronic device may include more or fewer components than those shown in the figure, or a combination of some components, or the components disposed differently. In this embodiment of the present invention, the electronic device includes but is not limited to a mobile phone, a tablet computer, a laptop computer, a palmtop computer, an in-vehicle terminal, a wearable device, a pedometer, and the like.

The radio frequency unit 1501 is configured to receive reminder information sent by a target group, where the reminder information includes first information, a name of the target group, and reply information for the first information;

the display unit 1506 is configured to display the reminder information and display a first button and a second button; and the display unit 1506 is further configured to:

in a case that an input on the first button is received, display a group chat session screen corresponding to the name of the target group, where currently displayed content of the group chat session screen includes the reply information; or in a case that an input on the second button is received, display a first session screen corresponding to a user sending the first information, and display the first information and the reply information on the first session screen.

Optionally, the first information is all or partial information content of the target information.

Optionally, the processor 1510 is configured to store a correspondence between the first information and the reply information; and the radio frequency unit 1501 is further configured to send the correspondence to a server.

Alternatively, the radio frequency unit 1501 is configured to receive reply information for first information;

the processor 1510 is configured to generate reminder information based on the first information and the reply information, where the reminder information includes the first information and the reply information; and the radio frequency unit 1501 is configured to send the reminder information to a target group.

Optionally, the first information is partial information content of target information, and the display unit 1506 is further configured to display the target information and display a reply button for the target information and a reply button for the first information.

The radio frequency unit 1501 is further configured to: in a case that an input on the reply button for the first information has been received, determine the first information and receive the reply information for the first information.

Optionally, the reminder information further includes a target account, and the target account is an account corresponding to a user in the target group.

In this embodiment of the present invention, the electronic device can also have the same beneficial technical effects as the foregoing embodiment, and details are not repeated herein.

It should be understood that in this embodiment of the present invention, the radio frequency unit 1501 may be configured to: receive and transmit signals in an information receiving/sending process or a call process; and specifically, after receiving downlink data from a base station, transmit the downlink information to the processor 1510 for processing, and in addition, transmit uplink data to the base station. Generally, the radio frequency unit 1501 includes but is not limited to an antenna, at least one amplifier, a transceiver, a coupler, a low noise amplifier, a duplexer, and the like. In addition, the radio frequency unit 1501 may also communicate with a network and other devices via a wireless communications system.

The electronic device provides a user with wireless broadband internet access through the network module 1502, for example, helping the user to transmit and receive e-mails, browse web pages, and access streaming media.

The audio output unit 1503 may convert audio data received by the radio frequency unit 1501 or the network module 1502 or stored in the memory 1509 into an audio signal and output the audio signal as a sound. Furthermore, the audio output unit 1503 may also provide audio output (for example, a call signal received sound or a message received sound) related to a specific function performed by the electronic device 1500. The audio output unit 1503 includes a speaker, a buzzer, a receiver, and the like.

The input unit 1504 is configured to receive an audio or video signal. The input unit 1504 may include a graphics processing unit (GPU) 15041 and a microphone 15042. The graphics processing unit 15041 processes image data of a still picture or video obtained by an image capture apparatus (such as a camera) in a video capture mode or an image capture mode. A processed image frame may be displayed on the display unit 1506. The image frame processed by the graphics processing unit 15041 may be stored in the memory 1509 (or another storage medium) or be transmitted by the radio frequency unit 1501 or the network module 1502. The microphone 15042 is capable of receiving sounds and processing such sounds into audio data. The processed audio data may be converted in a telephone call mode into a format that can be transmitted by the radio frequency unit 1501 to a mobile communications base station, for outputting.

The electronic device 1500 may further include at least one sensor 1505, for example, an optical sensor, a motion sensor, and other sensors. Specifically, the optical sensor may include an ambient light sensor and a proximity sensor. The ambient light sensor may adjust luminance of the display panel 15061 based on brightness of ambient light, and the proximity sensor may turn off the display panel 15061 and/or backlight when the electronic device 1500 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the electronic device, functions related to vibration recognition (such as pedometer and tapping), and the like. The sensor 1505 may also include a fingerprint sensor, a pressure sensor, an iris sensor, a molecular sensor, a gyroscope, a barometer, a hygrometer, a thermometer, an infrared sensor, and the like. Details are not described herein.

The display unit 1506 is configured to display information input by the user or information provided to the user. The display unit 1506 may include a display panel 15061, and the display panel 15061 may be configured in a form of a liquid crystal display (LCD), an organic light-emitting diode (OLED), or the like.

The user input unit 1507 may be configured to receive input digit or character information and generate key signal input related to user setting and function control of the electronic device. Specifically, the user input unit 1507 may include a touch panel 15071 and other input devices 15072. The touch panel 15071 is also referred to as a touchscreen and can collect a touch operation (such as an operation performed by the user on the touch panel 15071 or near the touch panel 15071 with a finger or by using any proper object or accessory such as a stylus) of the user on or near the touch panel 15071. The touch panel 15071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touch-point coordinates, and transmits the touchpoint coordinates to the processor 1510, and can receive a command transmitted by the processor 1510 and execute the command. In addition, the touch panel 15071 may be implemented in a plurality of forms, for example, as a resistive, capacitive, infrared, or surface acoustic wave touch panel. The user input unit 1507 may further include the other input devices 15072 in addition to the touch panel 15071. Specifically, the other input devices 15072 may include but are not limited to a physical keyboard, a function key (such as a volume control key or an on/off key), a trackball, a mouse, and a joystick. Details are not described herein.

Further, the touch panel 15071 may cover the display panel 15061. When detecting a touch operation on or near the touch panel 15071, the touch panel 15071 transmits the touch operation to the processor 1510 to determine a type of a touch event. Then, the processor 1510 provides a corresponding visual output on the display panel 15061 based on the type of the touch event. Although in FIG. 15, the touch panel 15071 and the display panel 15061 act as two independent parts to implement input and output functions of the electronic device, in some embodiments, the touch panel 15071 and the display panel 15061 may be integrated to implement the input and output functions of the electronic device. This is not specifically limited herein.

The interface unit 1508 is an interface between an external apparatus and the electronic device 1500. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 1508 may be configured to receive an input (for example, data information or power) from an external apparatus and transmit the received input to one or more elements within the electronic device 1500, or may be configured to transmit data between the electronic device 1500 and the external apparatus.

The memory 1509 may be configured to store software programs and various data. The memory 1509 may mainly include a program storage area and a data storage area. The program storage area may store an operating system, and an application program required by at least one function (for example, a sound playback function or an image playback function). The data storage area may store data (for example, audio data or a phone book) created according to use of the mobile phone. In addition, the memory 1509 may include a high-speed random access memory, and may further include a non-volatile memory such as at least one disk storage device, a flash memory device, or another volatile solid-state storage device.

The processor 1510 is a control center of the electronic device, uses various interfaces and lines to connect parts of the entire electronic device, and executes various functions and processing data of the electronic device by running or executing software programs and/or modules stored in the memory 1509 and invoking data stored in the memory 1509, so as to perform overall monitoring on the electronic device. The processor 1510 may include one or more processing units. Preferably, an application processor and a modem processor may be integrated in the processor 1510. The application processor primarily processes an operating system, user interfaces, application programs, and the like. The modem processor primarily processes radio communication. It can be understood that the modem processor may alternatively be not integrated in the processor 1510.

The electronic device 1500 may further include a power supply 1511 (such as a battery) that supplies power to components. Preferably, the power supply 1511 may be logically connected to the processor 1510 through a power management system. In this way, functions such as charge management, discharge management, and power consumption management are implemented by using the power management system.

In addition, the electronic device 1500 includes some functional modules that are not shown. Details are not described herein.

Preferably, an embodiment of the present invention further provides an electronic device, including a processor 1510, a memory 1509, and a computer program stored in the memory 1509 and capable of running on the processor 1510. When the computer program is executed by the processor 1510, the processes of the foregoing information display method embodiments shown in FIG. 1 and FIG. 2 are implemented; or when the computer program is executed by the processor 1510, the processes of the foregoing information sending method embodiment shown in FIG. 7, with the same technical effects achieved. To avoid repetition, details are not described herein again.

An embodiment of the present invention further provides a computer-readable storage medium, where a computer program is stored in the computer-readable storage medium, and when the computer program is executed by a processor, the processes of the foregoing information display method embodiments shown in FIG. 1 and FIG. 2 are implemented; or when the computer program is executed by a processor, the processes of the foregoing information sending method embodiment shown in FIG. 7, with the same technical effects achieved. To avoid repetition, details are not described herein again. The computer-readable storage medium is, for example, a read-only memory (ROM), a random access memory (RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present invention.

Some embodiments of the present invention have been described with reference to the accompanying drawing; however, the present invention is not limited to the aforesaid embodiments, and these embodiments are merely illustrative but are not intended to limit the present invention. A person of ordinary skill in the art may further derive many other implementations according to the teachings of the present invention and within the scope defined in the claims, and all of the implementations shall fall within the scope of the present invention.

What is claimed is:

1. An information sending method, performed by an electronic device, comprising:
   receiving reply information for first information;
   generating reminder information based on the first information and the reply information, wherein the reminder information comprises the first information and the reply information;
   sending the reminder information to a target group so that the electronic device displays a first button and a second button;
   after receiving an input on the first button, displaying a group chat session interface corresponding to the name of the target group, wherein currently displayed content of the group chat session interface comprises the reply information; and
   generating and displaying a reply button for text messages, a reply button for voice messages, and a reply button for video messages; and
   after receiving an input on the second button, displaying a first session interface corresponding to a user sending the first information, and displaying the first information and the reply information on the first session interface;

wherein the first information is partial information content of target information, and before the receiving reply information for first information, the method further comprises:

displaying the target information, and displaying a reply button for the target information and a reply button for the first information; and receiving an input on the reply button for the first information, determining the first information and receiving the reply information for the first information.

2. The method according to claim 1, wherein the reminder information further comprises a target account, and the target account is an account corresponding to a user in the target group.

3. An electronic device, comprising: a memory, a processor, and a computer program stored in the memory and capable of running on the processor, wherein when the computer program is executed by the processor, the steps of the information sending method are implemented, wherein the method comprises:

receiving reply information for first information;

generating reminder information based on the first information and the reply information, wherein the reminder information comprises the first information and the reply information;

sending the reminder information to a target group so that an electronic device displays a first button and a second button;

after receiving an input on the first button is received, displaying a group chat session interface corresponding to the name of the target group, wherein currently displayed content of the group chat session interface comprises the reply information; and generating and displaying a reply button for text messages, a reply button for voice messages, and a reply button for video messages; and after receiving an input on the second button, displaying a first session interface corresponding to a user sending the first information, and displaying the first information and the reply information on the first session interface;

wherein the first information is partial information content of target information, and before the receiving reply information for first information, the method further comprises:

displaying the target information, and displaying a reply button for the target information and a reply button for the first information; and receiving an input on the reply button for the first information, determining the first information and receiving the reply information for the first information.

4. The electronic device according to claim 3, wherein the reminder information further comprises a target account, and the target account is an account corresponding to a user in the target group.

* * * * *